United States Patent
Sebastian et al.

(10) Patent No.: US 7,792,596 B2
(45) Date of Patent: Sep. 7, 2010

(54) METHOD OF SIGNAL TRANSFORMATION FOR POSITIONING SYSTEMS

(75) Inventors: Abu Sebastian, Adliswil (CH); Reza S. Moheimani, Callaghan (AU)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/059,991

(22) Filed: Mar. 31, 2008

(65) Prior Publication Data
US 2009/0248773 A1 Oct. 1, 2009

(51) Int. Cl.
*G05B 13/02* (2006.01)
(52) U.S. Cl. .......................... 700/30; 700/56
(58) Field of Classification Search .................. 700/30, 700/56
See application file for complete search history.

(56) References Cited

U.S. PATENT DOCUMENTS

| 4,745,497 | A | 5/1988 | Ozawa |
| RE037,560 | E | 2/2002 | Elings |
| 7,266,425 | B2 | 9/2007 | Bhatt et al. |
| 2004/0013420 | A1 | 1/2004 | Hara |
| 2007/0115484 | A1* | 5/2007 | Huang et al. ............ 356/604 |
| 2007/0132423 | A1 | 6/2007 | Ajima et al. |
| 2007/0206204 | A1* | 9/2007 | Jia et al. ............... 356/604 |

OTHER PUBLICATIONS

Phakamach, P., Akkaraphong, C. "Robust Position Control of a Synchronous Motor Using Discrete Sliding Mode Model Following Controller". TENCON 2005 (2005): 1-6.*
S. Devasia, E. Eleftheriou, S.O.R. Moheimani, "A survey of control issues in nanopositioning", IEEE Transactions on control system technology, Sep. 2007, pp. 802-823, vol. 15(5).
A. Sebastian and S. Salapaka, "Design methodologies for robust nanopositioning", IEEE Transactions on control system technology, Nov. 2005, pp. 868-876, vol 13(6).
Salapaka, S. Sebastian, A. Cleveland, J. P. Salapaka, M. V. "High bandwidth nano-positioner: A robust control approach", Sep. 2002, pp. 3232-3241, Review of Scientific Instruments, vol. 73, No. 9.
Jin-Hua She, M. Nakano, T. Naitoh, "High-precision positioning control by position-dependent repetitive control method", Feb. 1995, pp. 374-379, 1st World Congress Intelligent Manufacturing Processes & Systems, vol. 1, Mayaguez/San Juan, Puerto Rico.

* cited by examiner

*Primary Examiner*—Ryan A Jarrett
(74) *Attorney, Agent, or Firm*—Kenneth L. Sherman, Esq.; Michael Zarrabian, Esq.; Myers Andras Sherman LLP

(57) ABSTRACT

A method and apparatus for signal transformation for positioning control in positioning systems is provided. The positioning involves performing a signal transformation by determining a transform and an inverse transform between a triangular reference signal and a model reference signal with less frequency content, for transforming the triangular reference signal into a ramp signal; and providing a controller including a double integral module, configured for tracking the model reference signal with zero steady state error, for controlling a positioning system.

1 Claim, 4 Drawing Sheets

METHOD OF SIGNAL TRANSFORMATION FOR POSITIONING SYSTEMS

BACKGROUND OF THE INVENTION

1. Field of the Invention

The present invention relates generally to signal transformation and in particular to signal transformation for scanning.

2. Background Information

Precise positioning is the enabling technology for a variety of applications ranging from scanning probe microscopy and semiconductor manufacturing systems to data storage devices. With the advent of nanotechnology and bio-nanotechnology, applications of precise positioning have further increased. Positioners such as piezo-electric flexure stages and MEMS micro-scanners are widely employed to perform fast scan operations in these devices. Fast scan operations inevitably require the design of high bandwidth controllers.

However, high bandwidth controllers cause closed-loop systems to be susceptible to measurement noise. This significantly impacts the positioning accuracy, thus defeating the purpose of using a highly precise positioner in the first place. Low bandwidth controllers on the other hand would not be able to track the high frequency content reference signals. This is a fundamental limitation in a one-degree of freedom linear control system. In a one-degree of freedom linear control system, the reference tracking transfer function relating the position with the reference signal is equal to the noise sensitivity transfer function relating the position with the measurement noise.

Within the framework of feedback control, there are two conventional linear system approaches that are typically employed. One is to shape the reference signal so as to reduce the high frequency content. In the case of a triangular reference signal, which is widely preferred, this amounts to performing a sine-cap at the turn arounds. This approach does not significantly affect the frequency content of the desired reference signal without deteriorating the quality of the signal. Another approach is to design a higher degree of order controllers which are not bound by the above constraint. Even then, a complete decoupling is not possible.

SUMMARY OF THE INVENTION

A method and apparatus for signal transformation for positioning control in positioning systems is provided. The positioning involves performing a signal transformation by determining a transform and an inverse transform between a triangular reference signal and a model reference signal with less frequency content, for transforming the triangular reference signal into a ramp signal; and providing a controller including a double integral module, configured for tracking the model reference signal with zero steady state error, for controlling a positioning system.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and apparatus for signal transformation for positioning control in positioning systems such as in ultra-fast scanning. One embodiment involves performing a (nonlinear or nonlinear) signal transformation by determining a transform and an inverse transform between a triangular reference signal and a model reference signal with less frequency content, for transforming the triangular reference signal into a ramp signal; and providing a controller including a double integral module, configured for tracking the model reference signal with zero steady state error, for controlling a positioning system.

The invention is applicable to precise positioning for a variety of applications ranging from scanning probe microscopy and semiconductor manufacturing systems to data storage devices. Fast scan operations require controllers, involving feedback control. In that regard, the invention provides a signal transformation approach involving finding a transform and an inverse transform between a reference signal and a dummy reference signal with much less frequency content. A controller is then configured for tracking the dummy reference signal with zero steady state error. The transform is nonlinear, e.g., a map that transforms a triangular reference signal into a ramp signal.

For improving a positioner (scanning) system that suffers from measurement noise coupling into the feedback loop, the present invention provides a transform and inverse transform between the reference signal and a dummy reference signal which has a lower frequency bandwidth. Thereby the noise coupling is reduced while the positioning signal is processed unchanged. The invention is useful for any positioner such as a scanning probe, scanning lithography systems, etc.

A preferred embodiment involves application to a ramp signal with a triangular reference signal. The process involves finding a transform and an inverse transform between the reference signal and a dummy reference signal with much less frequency content. A controller for controlling a positioning system then includes a double integral component, and tracks the dummy reference signal with zero steady state error. Significantly high frequency triangular reference signals could be tracked faithfully with very low bandwidth controllers.

Figure 1:
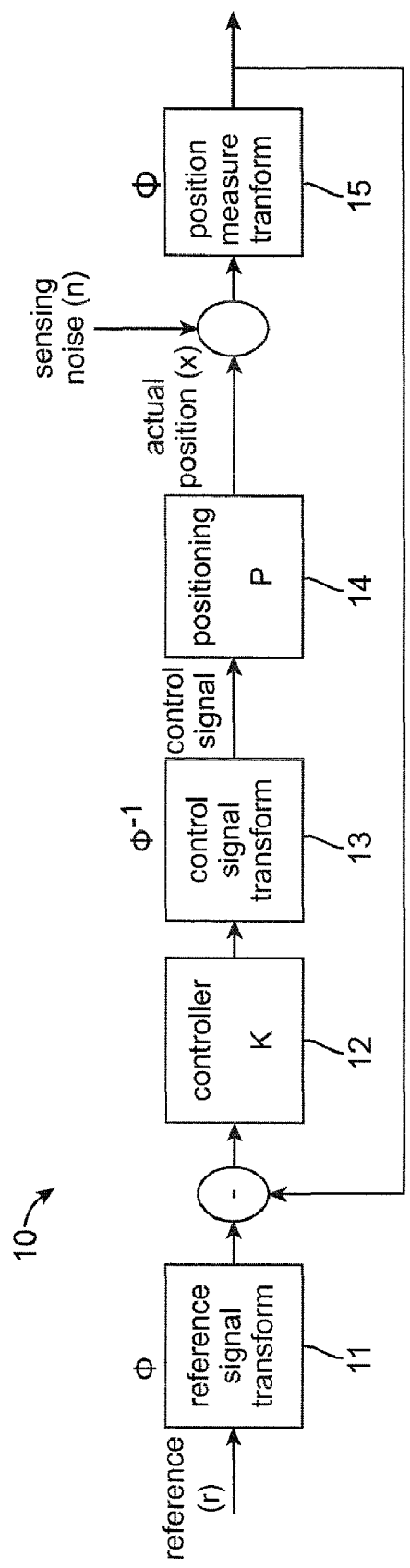
FIG. 1 shows a functional block diagram of a positioning system implementing signal transformation for positioning control, according to an embodiment of the invention.

FIG. 1 shows a functional block diagram of system 10 for signal transformation for positioning such as used in ultra-fast scanning. The system 10 includes a reference signal transform function 11, a controller 12, a control signal transform function 13, a positioning function 14 and a position measure transform function 15.

Figure 2:
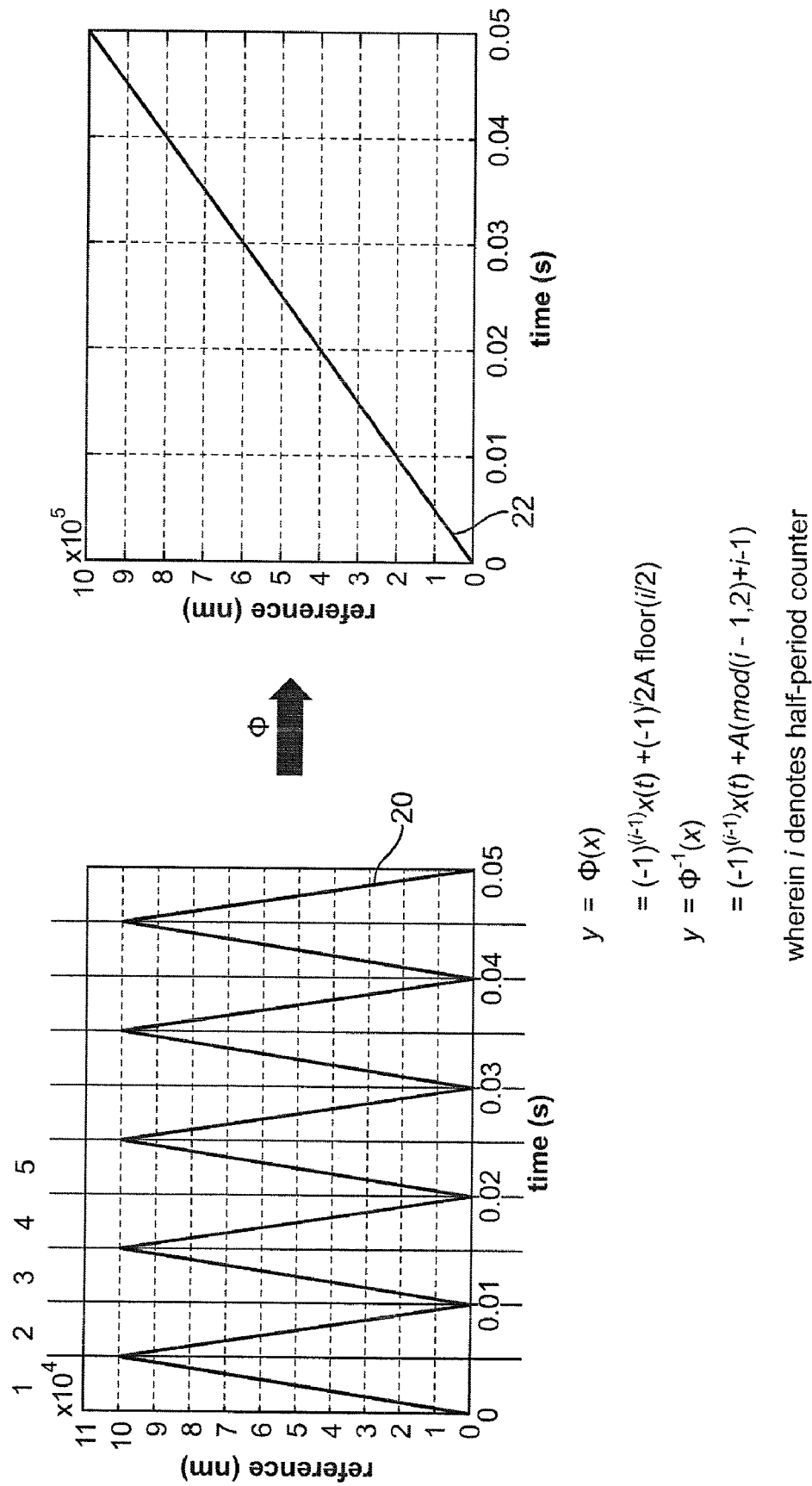
FIG. 2 shows an example transform function for the system of FIG. 1.

The reference signal transform function 11 implements a transform Φ, an example of which is shown in FIG. 2. Referring to FIGS. 1 and 2, the transform Φ transforms a triangular signal reference(r) 20 to a ramp signal 22. In one example, the transform may comprise a nonlinear map that transforms a triangular reference signal into a ramp signal.

The controller 12 implements a double integral function and tracks a dummy reference signal with zero steady state error.

The control signal transform function 13 perform an inverse transform $\Phi^{-1}$, and transforms the output of the controller 12 to a control signal for the positioning function 14, which determines an actual position(x).

The actual position(x) and sensing position(n) are combined to provide a combined signal for the position measurement transform Φ implemented by function 15.

The output of function 15 is fed back to be subtracted from the output of the reference signal transform function 11. The result of the subtraction serves as result signal input to the controller 12 which tracks that result signal with zero steady state error.

Figure 3:
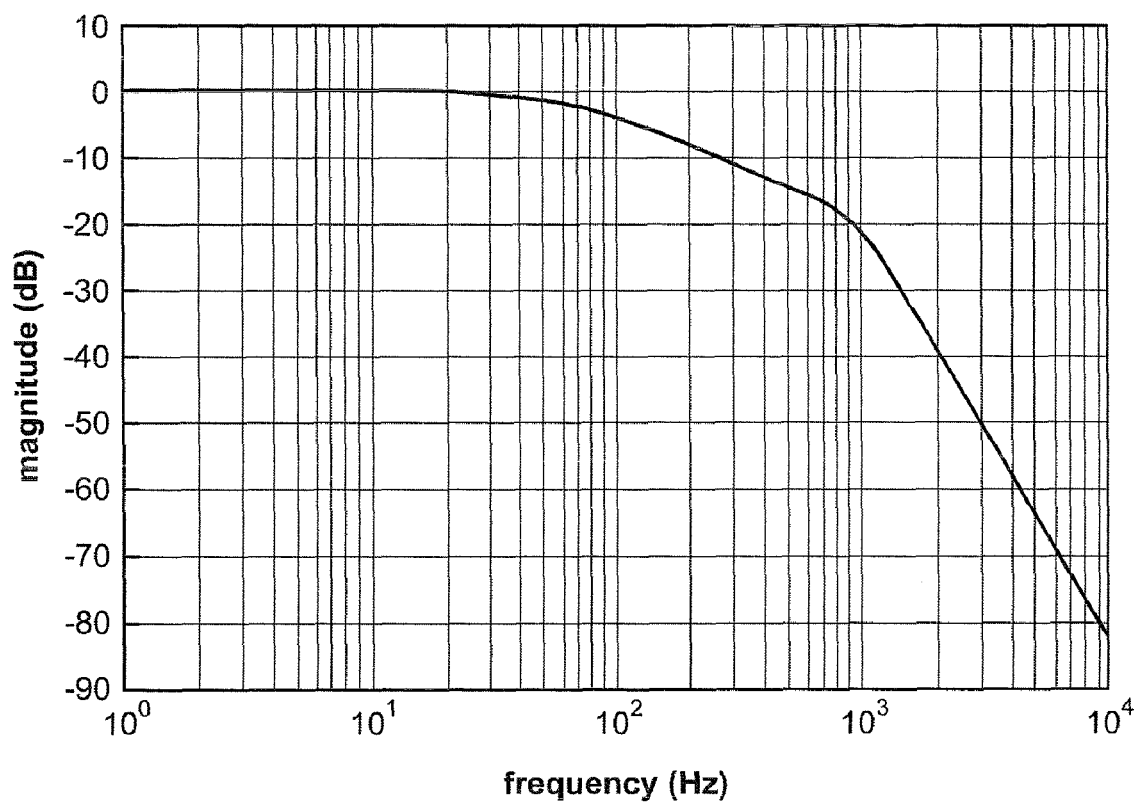
FIG. 3 shows an example reference tracking transfer function for the system of FIG. 1.
Figure 4:
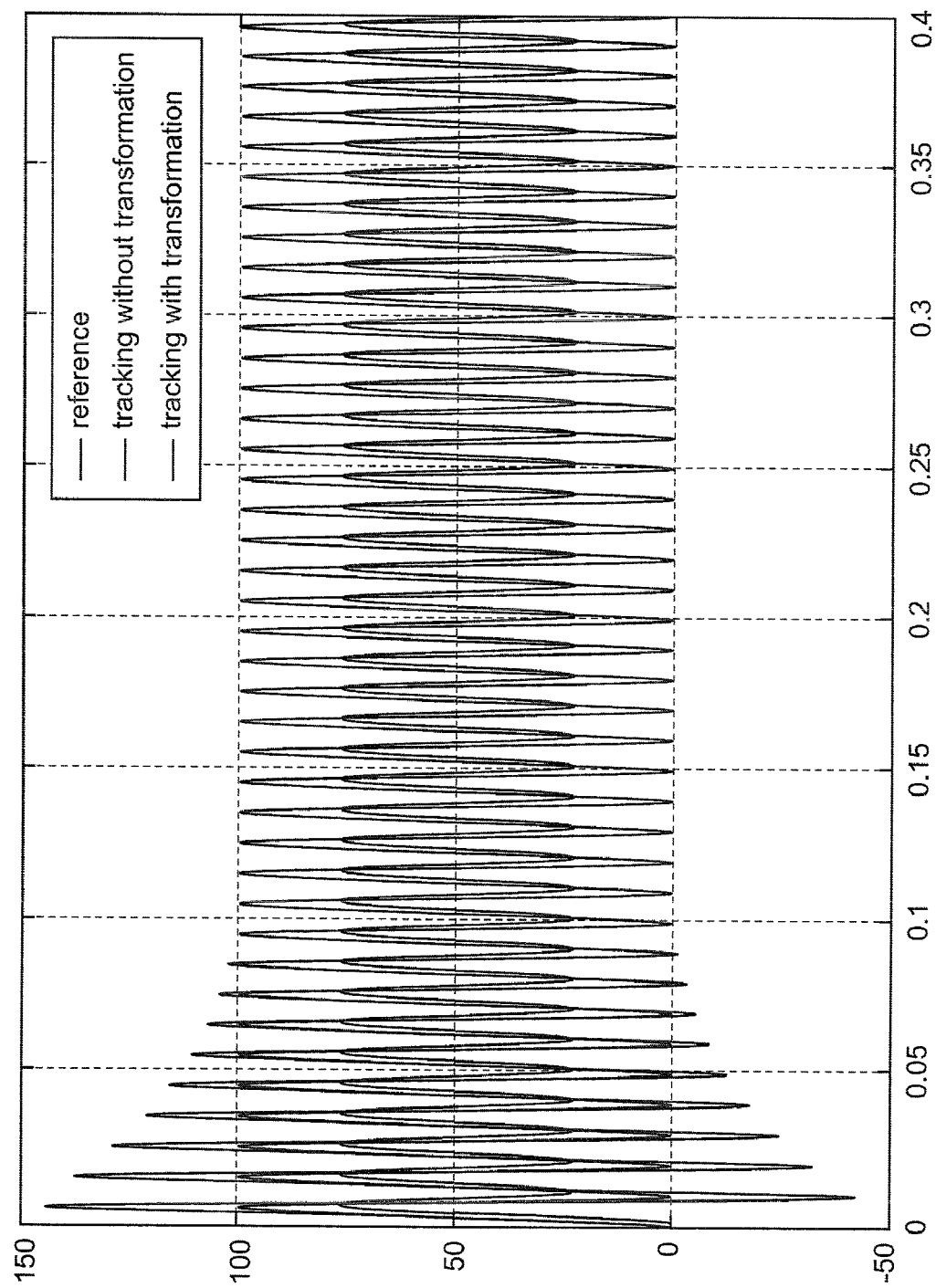
FIG. 4 shows example tracking of a 100 Hz triangular reference signal with minimal error using the system of FIG. 1.

FIG. 3 shows an example reference tracking transfer function indicating a bandwidth of around 70 Hz which corresponds to low noise sensitivity. The system 10 allows tracking a 100 Hz triangular signal with this controller using said transformation, according to an embodiment of the invention. FIG. 4 shows example tracking of a 100 Hz triangular reference signal with minimal error.

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of signal transformation for positioning control in a positioning system, comprising:

performing a signal transformation by determining a transform and an inverse transform between a triangular reference signal and a model reference signal with less frequency content, for transforming the triangular reference signal into a ramp signal; and providing a hardware controller including a double integral module, configured for tracking the model reference signal with zero steady state error, for controlling a positioning system.

\* \* \* \* \*